Oct. 29, 1968  R. L. SCHMIDT ET AL  3,408,160
VISCOSITY REDUCTION OF ALUMINA HYDRATE FILTER CAKE
Filed March 10, 1966
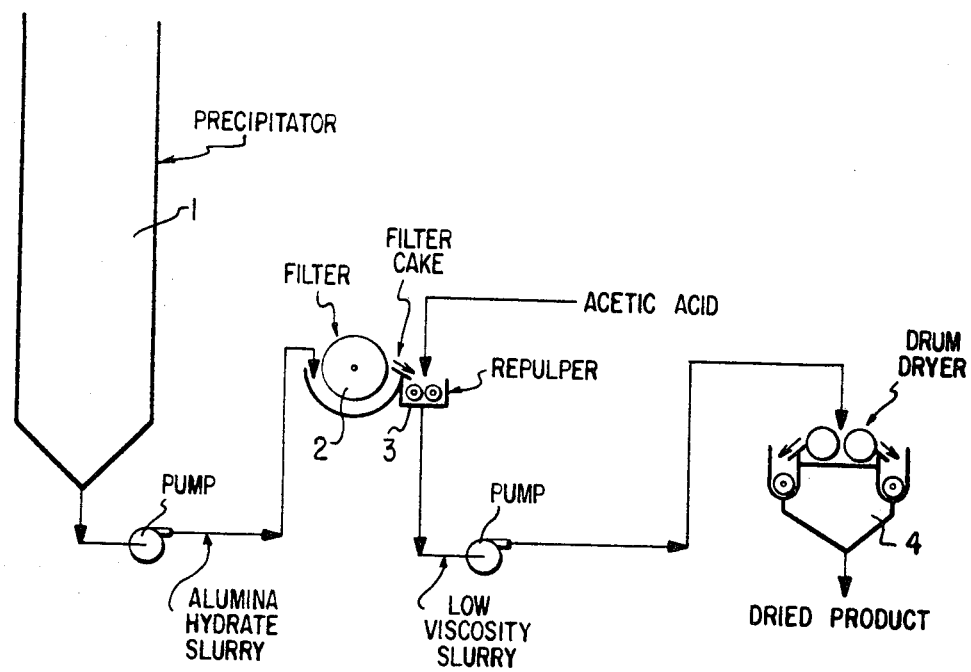
INVENTORS.
RICHARD LEE SCHMIDT
JOHN FRANKLIN MORGAN
BY Glenn, Palmer, Matthews, & Lyne
ATTORNEYS.

3,408,160
VISCOSITY REDUCTION OF ALUMINA HYDRATE
FILTER CAKE
Richard Lee Schmidt, Bryant, and John Franklin Morgan, Benton, Ark., assignors to Reynolds Metals Company, Richmond, Va., a corporation of Delaware
Filed Mar. 10, 1966, Ser. No. 533,188
6 Claims. (Cl. 23—143)

This invention relates to an improved method for the preparation of finely divided alumina hydrate. More particularly, the invention concerns a novel method for reducing the viscosity of alumina hydrate filter cake, without dilution thereof with water.

In the manufacture of alumina hydrate, an aluminus ore, such as bauxite, is treated with caustic alkali to form an aqueous solution of sodium aluminate. By seeding a batch of supersaturated sodium aluminate solution with alumina hydrate crystals, about half of the dissolved alumina is precipitated as alumina hydrate. The product from precipitation is then pumped through a series of classifiers and settlers to separate the alumina hydrate from the spent liquor, and the resulting alumina hydrate is filtered, for example in a conventional rotary filter. The alumina hydrate filter cake, after being washed with water on the filter, ordinarily comes off the filter at a solids content of about 45% to 50%. The water is then removed from the filter cake by drying in a suitable type of dryer, such as, for example, a drum dryer or a spray dryer.

One widely used method of transferring the alumina hydrate filter cake to the dryer is to reslurry the cake with water to form a pumpable slurry. In order to do this it is usually necessary to add a considerable quantity of water to the cake to obtain a pumpable slurry containing about 10% to 15% solids. This added water must be subsequently evaporated in the dryer, thereby adding to production costs. Accordingly, the problem was presented of finding a way of reducing the viscosity of the alumina hydrate filter cake containing, for example, 45% to 50% solids to make it readily flowable, without additional dilution with water, and thereby to avoid an evaporation load on the drying equipment.

In accordance with the present invention, there is provided a novel method for reducing the viscosity of alumina hydrate in the form of a wet friable solid, such as a filter cake, without addition of water, by incorporating in said alumina hydrate a small proportion of an acid viscosity reducing agent selected from the group consisting of (a) aliphatic monocarboxylic acids having 1–2 carbon atoms, such as formic acid, acetic acid or acetic anhydride, and (b) mineral acids such as hydrochloric acid or nitric acid. The solids content of the alumina hydrate wet solid is advantageously between about 45% and 60%. The amount of the acid viscosity reducing agent added is critical and is in the range from about 0.05% to about 0.15% by weight, based upon the dry alumina hydrate content of the material being treated, and is preferably between about 0.05% and about 0.1%. The preferred viscosity reducing agent is acetic acid.

The incorporation of the acid viscosity reducing agent is advantageously accomplished, in accordance with the invention, by having the filter cake discharged from the filter drum into a repulper into which the acid is introduced and admixed with the filter cake. Thus, for example, by adding about 0.05% by weight of acetic acid (glacial), based upon the dry hydrate content of the filter cake, to a 46% solids content filter cake, the viscosity is reduced from 4600 to 50 centipoises.

The action of the aforementioned acid viscosity reducing agents is selective, it having been found that aliphatic monocarboxylic acids with more than two carbon atoms, such as propionic, butyric or valeric acid, do not exert this effect. Likewise, other mineral acids than hydrochloric or nitric acids, such as, for example, sulfuric, phosphoric or carbonic acid, do not serve to reduce cake viscosity. However, because of the corrosive nature of HCl and HNO₃, it is preferred to employ the milder, and less corrosive, organic acids, such as formic and acetic acids. The concentrations of the acid can be as low as 10% or as high as 100%. However, in order to minimize water dilution, with need for subsequent evaporation, a concentrated acid is preferred.

It was also found that the organic acids were effective in reducing viscosity at solids contents higher than that of a conventional filter cake. Thus, for example, by the addition of dry alumina hydrate to a filter cake, the solids content was raised to about 61%, but even at this high solids content, the organic acid was found to reduce the viscosity and to transform the filter cake into an easily pumpable slurry. However, above about 61% solids content, no further effect of this kind results.

The dried product from the acid treated material was found to possess the same rheological properties as the untreated cake.

It was also found that the soda content of the filter cake has some effect on the degree of viscosity reduction. Thus, when the soda content of the cake was about 0.3% Na₂O or higher, the viscosity of the acid treated cake was much higher than with cake of lower soda content, even though the slurry was still pumpable.

In order to minimize the corrosive action of the acid upon metal surfaces, such as the cast iron of the drum dryer, or the mild steels of the spray dryer, an inhibiting agent which is compatible with the acid may be employed, to prevent pickup of iron. Thus, there may be employed about 1.0% by weight of the acid, of an inhibitor commercially available under the designation Oakite PC-9 for the organic acids, and Oakite PC-8 for the mineral acids (Oakite Products, Inc., New York).

The accompanying drawing shows a schematic arrangement of the apparatus, in the form of a flow sheet, for performing the method of the invention. Alumina hydrate from the precipitator 1 in the form of a slurry is pumped to rotary filter 2, from which the filter cake is discharged to a repulper 3, in which the addition of the acid viscosity reducing agent takes place. The resulting low viscosity cake slurry is then pumped to a drum dryer 4, on which it is converted to dried product.

The practice of the invention is illustrated by the following examples, which are not, however, to be considered as limiting:

Example 1

A filter cake of alumina hydrate, having an average particle size about 0.9 micron, and a solids content of 46% was treated with various amounts of glacial acetic acid, based upon the solids content of the cake. The results are shown in the following table:

TABLE 1

| Percent Acetic Acid Added (Based on the solid content of the cake) | pH | Viscosity,[1] Centipoises | Brightness[2] of Dried Product |
|---|---|---|---|
| None | 10.2 | ([3]) | 102.2 |
| 0.025 | 7.2 | 4,600 | 102.2 |
| 0.050 | 5.8 | 50 | 102.2 |
| 0.10 | 4.6 | 50 | 102.2 |
| 0.15 | 4.1 | 45 | 102.2 |
| 0.30 | 3.6 | 45 | 102.2 |
| 0.60 | 3.5 | 45 | 102.2 |

[1] Viscosity was measured using a Brookfield viscometer, No. 1 spindle at 60 r.p.m.
[2] Brightness was measured with a Photovolt reflectrometer using MgO as a standard reading 100.
[3] Solid.

It will be seen that by the addition of 0.05% by weight of acetic acid to the 46% solids filter cake, the viscosity was reduced to 50 centipoises. From a nonpumpable solid, the filter cake was transformed into an easily pumpable slurry which handled well on the drum dryer, spreading evenly and improving the dryer operation. The dried product had the same brightness and whiteness as the product made without the additive, indicating that the acid does not adversely affect the desirable properties of the alumina hydrate, while benefiting the reducing cake viscosity.

Example 2

The influence of the percentage of solids in the filter cake upon the viscosity reduction is shown in the following table, representing the effect of addition of about 0.15% acetic acid (based on weight of the solids) to slurries prepared with different percentages of solids:

TABLE 2

| Percent Solid in Cake | Viscosity, Centipoises (Without Acid Addition) | Viscosity, Centipoises (With Acid Addition) |
| --- | --- | --- |
| 50 | [1] 6,900 | 20 |
| 54 | [2] | 25 |
| 57 | [2] | 35 |
| 61 | [2] | 48 |
| 63 | [2] | [2] |

[1] Viscosity was measured using a Brookfield viscometer, No. 1 spindle at 60 r.p.m.
[2] Solid.

What is claimed is:

1. Method for reducing the viscosity of alumina hydrate in the form of a wet fiable solid which comprises incorporating in said alumina hydrate from about 0.05% to about 0.15% by weight, based upon the dry alumina hydrate content, of an acid viscosity reducing agent selected from the group consisting of (a) aliphatic monocarboxylic acids containing from 1 to 2 carbon atoms, and (b) mineral acids selected from the group consisting of hydrochloric and nitric acid.

2. Method for reducing the viscosity of alumina hydrate in the form of a wet friable solid having a solids content between about 45% and about 60% which comprises incorporating in said alumina hydrate from about 0.05% to about 0.15% by weight, based upon the dry alumina hydrate content, of an acid viscosity reducing agent selected from the group consisting of acetic acid, acetic anhydride, formic acid, hydrochloric acid, and nitric acid.

3. The method of claim 1 in which the alumina hydrate is a filter cake of precipitated alumina hydrate.

4. The method of claim 1 in which the viscosity reducing agent is acetic acid.

5. The method of claim 1 in which a corrosion inhibiting agent is incorporated with the viscosity reducing agent.

6. The method of claim 1 in which the alumina hydrate has a soda content below about 0.3% by weight.

No references cited.

OSCAR R. VERTIZ, *Primary Examiner.*

G. T. OZAKI, *Assistant Examiner.*